(No Model.) 6 Sheets—Sheet 1.

J. F. CRUDGINTON & E. E. NORTON.
MACHINE FOR SETTING STUDS OR RIVETS.

No. 453,423. Patented June 2, 1891.

WITNESSES
C. M. Newman
Arley J. Munson

INVENTORS
James F. Crudginton and
Eugene E. Norton
By J. M. Wooster Atty.

(No Model.) 6 Sheets—Sheet 2.

J. F. CRUDGINTON & E. E. NORTON.
MACHINE FOR SETTING STUDS OR RIVETS.

No. 453,423. Patented June 2, 1891.

WITNESSES
C. M. Newman,
Arley P. Munson.

INVENTORS
James F. Crudginton and
Eugene E. Norton
By A. M. Wooster
Atty.

(No Model.) 6 Sheets—Sheet 3.

J. F. CRUDGINTON & E. E. NORTON.
MACHINE FOR SETTING STUDS OR RIVETS.

No. 453,423. Patented June 2, 1891.

WITNESSES
C. M. Newman,
Arley J. Munson.

INVENTORS
James F. Crudginton and
Eugene E. Norton
By J. M. Wooster atty.

(No Model.) 6 Sheets—Sheet 4.

J. F. CRUDGINTON & E. E. NORTON.
MACHINE FOR SETTING STUDS OR RIVETS.

No. 453,423. Patented June 2, 1891.

WITNESSES
C. M. Newman
Arley I. Munson

INVENTORS
James F. Crudginton
Eugene E. Norton
By A. M. Wooster attys.

(No Model.) 6 Sheets—Sheet 5.

J. F. CRUDGINTON & E. E. NORTON.
MACHINE FOR SETTING STUDS OR RIVETS.

No. 453,423. Patented June 2, 1891.

WITNESSES
C. M. Newman,
Riley I. Munson.

INVENTORS
James F. Crudginton and
Eugene E. Norton
By H. M. Wooster
Atty.

(No Model.) 6 Sheets—Sheet 6.
J. F. CRUDGINTON & E. E. NORTON.
MACHINE FOR SETTING STUDS OR RIVETS.

No. 453,423. Patented June 2, 1891.

WITNESSES
C. M. Newman
Riley I. Munson

INVENTORS
James F. Crudginton and
Eugene E. Norton
By H. M. Wooster
Atty.

UNITED STATES PATENT OFFICE.

JAMES F. CRUDGINTON AND EUGENE E. NORTON, OF BRIDGEPORT, CONNECTICUT.

MACHINE FOR SETTING STUDS OR RIVETS.

SPECIFICATION forming part of Letters Patent No. 453,423, dated June 2, 1891.

Application filed September 19, 1890. Serial No. 365,455. (No model.)

*To all whom it may concern:*

Be it known that we, JAMES F. CRUDGINTON and EUGENE E. NORTON, citizens of the United States, residing at Bridgeport, in the county of Fairfield and State of Connecticut, have invented certain new and useful Improvements in Machines for Setting Studs or Rivets; and we do hereby declare the following to be a full, clear, and exact description of the invention, such as will enable others skilled in the art to which it appertains to make and use the same.

Our invention has for its object to produce a simple, reliable, and durable machine of this class, the studs or rivets to be set being poured into a hopper, all of the operations of the machine being automatic, and it being impossible for any stud or rivet to be set improperly.

Our machine is adapted for general uses wherever it is required that studs or rivets be set in place during the operation of manufacturing metallic articles, an important use being in setting the fastening-studs in corset-steels, and we have selected this type of machine for the purpose of illustrating the principle of our invention, and shall use the term "stud" in the specification in the broad sense to designate any special form of stud or rivet that may require to be set.

In the accompanying drawings, forming part of this specification, Figure 1 is a front elevation of the entire machine; Fig. 1ª, a detail sectional view of the box which holds the steels in which the studs are to be set both before and after the operation of setting.

Similar numbers denote like parts in all the figures of the drawings.

1 denotes a table, preferably a heavy metallic plate; 2, the legs by which it is supported, and 3 heavy frame-work, which supports the operative parts of the machine. The base of this frame-work (denoted by 4) is rigidly secured to the table by bolts. (Not shown.)

5 denotes the main shaft of the machine, to which power is applied by a belt (not shown) running over a heavy pulley 6, which also serves as a fly-wheel. This pulley is loose on the shaft and is connected by a clutch, as will presently be explained. At the opposite end of this shaft and on the outer side of the frame-work is a gear 7, which meshes with an intermediate gear 8, mounted on a stud 9, extending outward from the frame-work. Shaft 5 is provided with eccentrics, (not shown,) which are encircled by eccentric-straps 10.

11 denotes connecting-rods rigidly connected to the eccentric-straps and pivoted to the gate or cross-head 12, which reciprocates vertically in suitable ways in the frame-work.

13 denotes a shaft journaled just above the base of the frame-work. This shaft has at its outer end a gear 14, which meshes with intermediate gear 8, said shaft being also provided with cams 15, 16, 17, and 18, the functions of which will presently be explained.

19 denotes a shaft mounted at the back of the frame-work, to which motion is imparted by a belt 20, running over a belt-pulley 21 on said shaft and a belt-pulley 22 on shaft 5, just inside of pulley 6.

Midway between the opposite sides of the frame-work on shaft 19 is a belt-pulley 23.

24 denotes a belt extending from pulley 23 to a pulley 25, mounted loosely on a shaft 26, which passes through the hopper 27, the portion of this shaft within the hopper being preferably inclosed in a sleeve 28.

Figures 13, 14, 15:
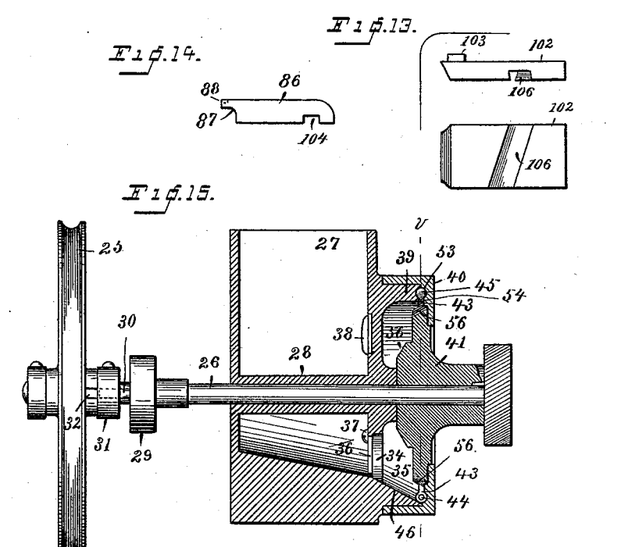
Fig. 13, a side elevation and inverted plan view of one of the cross-slides shown in Fig. 12 detached.
Fig. 14, a side elevation of one of the jaws detached.
Fig. 15, a central vertical section of the hopper and chamber, the relative position of the section-line being indicated by $m$ in Fig. 18.

The reason for mounting pulley 25 loosely on the hopper-shaft is to enable the operator to stop the feeding mechanism at any time without stopping other portions of the machine. In order to accomplish this result, we provide a simple form of clutch, consisting in the present instance of a sliding collar 29 on the shaft, having a pin 30, which passes through a disk 31, rigidly secured to the shaft, and is adapted to engage groove 32 in the hub of the pulley, as is clearly shown in Fig. 15, the sleeve in practice being operated by hand. The hopper may be of any suitable shape or size, the studs being poured into it loosely.

Figure 7:
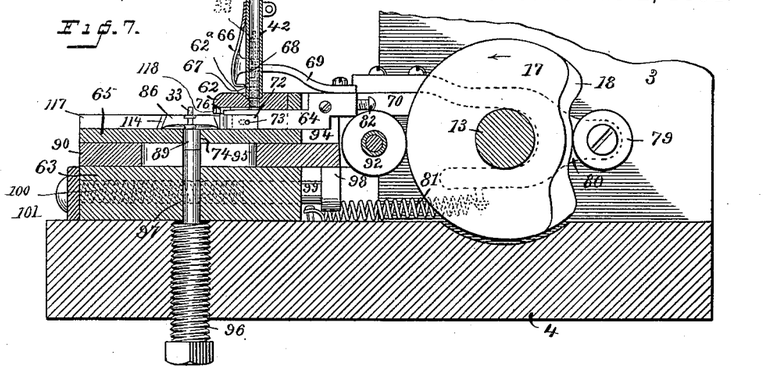
Figs. 7 and 8 are sections on the line $s\ s$ in Fig. 5, looking toward the left, Fig. 7 showing the position of the parts when a stud is ready to be set, and Fig. 8 showing the reverse position of the parts.
Figure 16:
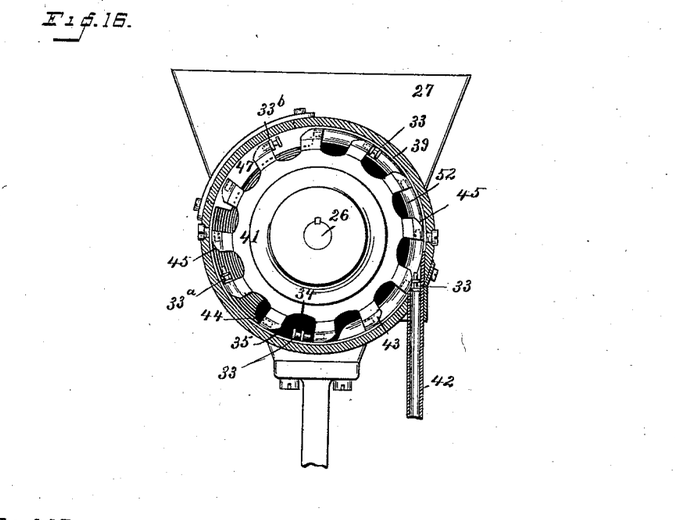
Fig. 16, a section on the line $v\ v$ in Fig. 15, looking toward the left, and showing the feed-wheel in elevation.
Figure 17:
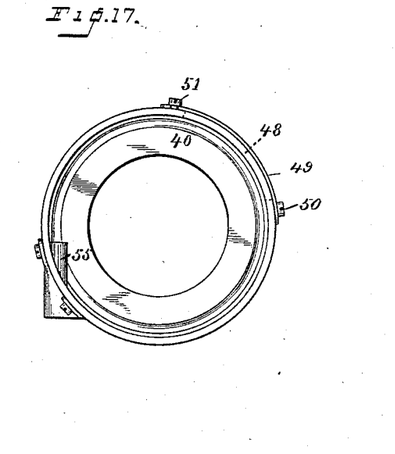
Fig. 17, an inner side elevation of the face-plate which forms the outer side of the chamber for the feed-wheel.
Figure 18:
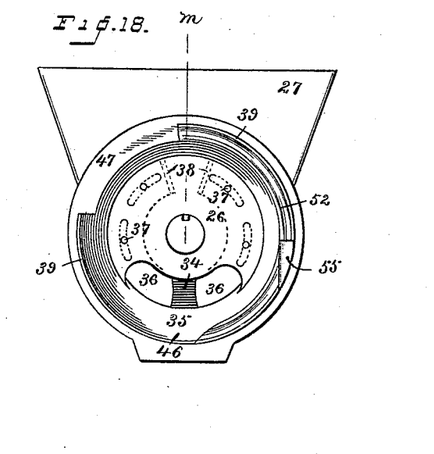
Fig. 18 is an elevation of the inner side of the chamber, the feed-wheel being removed.

It is of course well understood that lacing-studs for corset-steels are provided with two circular flanges or enlargements, one of which serves as the head of the stud, the other resting upon the top of the steel to which the stud is attached, the steel being provided with holes of suitable size to receive the shanks of the studs, which are headed down upon the opposite side of the steel. The shape of these studs is clearly shown in Figs. 7, 8, and 16, the studs being denoted by 33. It will of course be apparent that these studs must all be fed to the setting mechanism in a uniform position—in the present instance with the shanks up. This result we accomplish by the mechanism which we will now describe. The studs pass out through an opening 34 in the bottom of the hopper into a chamber 35, the passage of the studs from the hopper into the chamber being controlled by slides 36, moving in the present instance in curved ways and adapted to close more or less completely the opening from the hopper into the chamber. These slides in practice are held in position by screws 37, passing through curved slots in the slides and engaging the wall of the hopper, and are provided at their upper ends with thumb-pieces 38 for convenience in operation. Chamber 35 may be formed in any suitable or preferred manner. In the present instance we have shown said chamber as formed by a circular flange 39, projecting outward from the face of the hopper, and a cap 40, which engages the flange, as is clearly shown in Fig. 15, and may be locked in position by set-screws or in any suitable manner. Within this chamber and mounted on shaft 26 is a feed-wheel 41, this wheel and the interior of the chamber being constructed with special reference to each other, so as to pick up the studs and feed them into the feed-tube 42 as fast as they can possibly be required by the setting mechanism, while at the same time it is made impossible for a stud to pass into the feed-tube except in the special position the stud is required to be in when passed to the setting mechanism—in the present instance with the shank up. The feed-wheel, which in the present instance rotates from left to right, is provided with a series of arms 43, each of these arms consisting (see Fig. 15) of a relatively thin shank having at its outer end an enlargement, in the straight forward side of which is a socket 44 of just sufficient size to receive the shank of a stud. The rear ends of the enlargements are beveled off, as at 45, as will be again referred to. From the bottom of the hopper, somewhat more than half-way to the top at the left, as seen in Fig. 18, the inner side of the flange is beveled off, as at 46. (See Figs. 15 and 18.) Above the beveled portion of the flange and nearly to the top of the hopper the flange is entirely removed, leaving an open space 47. This open space coincides with a slot 48 in the side of the cap, the ends of the slot being indicated by dotted lines in Figs. 16 and 17, said slot being covered by a plate 49, (see Figs. 1, 16, and 17,) one end of said plate being pivoted on a screw-stud 50, the other end having a slot to engage a screw-stud 51. Beyond the open space the flange is provided with an inner rib 52, so that a groove is formed between said flange and rib. A corresponding groove and rib are formed in the cap, so that when the cap is in place upon the flange a curved tubular socket 53 is formed with a slot 54 leading into it, the tubular socket being of just sufficient size to receive the enlargements at the ends of arms 43 and the slot of sufficient size to receive the shanks. The grooves in the flange and cap terminate in half-sockets 55, which, when the parts are assembled, form a socket to receive the upper end of the feed-tube 42, as is clearly shown in Fig. 16. It will be seen from Fig. 15 that the outer face of the feed-wheel lies closely against the cap. The inner side is provided below the arms with bevels 56. In use each arm picks up a stud. If the studs are picked up crosswise, or if the outer head instead of the shank of the stud is engaged by the arm—as, for example, the stud marked 33ª in Fig. 16— it is apparent that before this arm can have reached the top of the chamber the stud will have dropped off from the arm and must fall inward and drop down to the bottom of the chamber again. It is only when studs are picked up like stud 33ᵇ in Fig. 16 that they can pass into the tubular sockets—that is to say, the shank of the stud must pass into a socket 44 in one of the arms of the feed-wheel. When studs are picked up in any other manner they cannot be held, but necessarily drop off into the chamber. When picked up properly—that is, like stud 33ᵇ— they pass into the tubular socket, are carried around by the arms in said socket, and drop down into the feed-tube with the shank up, as clearly shown in Fig. 16. It will be seen that this simple construction renders it absolutely impossible for studs to pass into the feed-tube in any except the proper position. The bevels 45 at the lower ends of the arms permit the studs to drop readily into the feed-tube, as is clearly shown in Fig. 16, while the open space at the top permits the operator to look into the chamber at any time. We have shown (see Figs. 16 and 18) the tubular socket as continued below the half-sockets, which receive the feed-tube. This is simply done as an additional safeguard against clogging, if a large number of studs get into the hopper at once. As already stated, we preferably contract the opening from the hopper into the chamber, so that but a small number of studs can pass in at a time. This also is a safeguard against clogging. We have found in practice, however, that with a feed-wheel constructed as shown and acting in connection with the tubular socket there is practically no danger of clogging under any circumstances. It is of course apparent that in a machine of this class it is preferable to run the feeding mechanism continuously with the machine, although the feeding mechanism will supply studs faster than they can possibly be set. In order to permit continuous running of the feeding mechanism, and at the same time to prevent clogging, we provide a slot 57 in the feed-tube, (see Fig. 2,) and under this slot a trough 58, which leads to a suitable receptacle 59, into which the surplus studs drop. As soon as the feed-tube is filled up to the slot the new studs which drop in from the tubular socket pass out at the slot and are carried by the trough into the receptacle. An ordinary cup may be used, which in the present instance we have shown as supported by a bracket 60, as is clearly shown in Fig. 2. 61 is a coupling-sleeve, which permits the lower section of the feed-tube to be detached at any time.

Turning now to Figs. 5 to 12, inclusive, we will describe the setting mechanism. The studs are carried down by the feed-tube, which terminates in a plate 62, which is itself rigidly bolted to a plate 63, in which the slides are recessed, the latter plate in turn being bolted to the base 4 of the frame-work. The recess 62ᵃ in plate 62, into which the studs drop, is practically a continuation of the feed-tube. As the studs pass into the setting mechanism, (see Fig. 7,) the head of each stud as it drops into plate 62 rests upon a plate 64, which is secured to and carried by a slide 70. When this slide moves backward out of the way, the stud drops down and rests upon the top of a stationary plate 65. As the machine is organized in this instance, plate 65 is T-shaped in plan (see Fig. 10) and L-shaped in side elevation, the upwardly-turned end of said plate being provided with a slot through which plate 64 slides. (See Figs. 7 and 8.)

66 denotes a spring which is clamped or otherwise secured to the feed-tube. The lower end of this spring is an arm, which is inwardly turned and is adapted to enter a slot 67 in the feed-tube and engage each stud between the heads, as clearly shown in Fig. 8, thus effectually preventing the feeding of but one stud at a time. The spring is provided with a projection 68, which is engaged by an arm 69, rigidly secured to slide 70. At each forward movement of the slide arm 69 engages the projection on the spring, as clearly shown in Fig. 7, forcing the inwardly-turned end of the spring out of the way and permitting a stud to drop down and leave the next stud in position to be engaged between the heads by the inwardly-turned end of the spring when the slide moves backward again, as clearly shown in Fig. 8.

71 (see Fig. 10) denotes a pair of springs, the outer ends of which are inwardly curved and which project forward from the upwardly-extending portion of plate 65. At the forward end of sliding plate 64 is a block 72, the forward end of the plate being recessed into a slot in the block, and the parts connected together by a pin 73, which passes through the block and through a slot (see dotted lines, Figs. 7 and 8) in the plate, so as to permit a slight movement of the sliding plate independently of the block. When the backward movement of the sliding plate takes place, the stud drops down into a recess in front of the plate and block, the forward end of the block being inwardly curved and forming, in connection with the inwardly-curved ends of springs 71, a recess 71ᵃ of sufficient size to receive the stud freely, this recess being clearly shown at the left in Fig. 10. When the forward movement of the sliding plate takes place, as shown at the right in Fig. 10, the stud is carried forward by the end of the plate and the block. The block is of sufficient height to engage the two heads or flanges of the stud. It will be apparent, owing to the slotted connection between the block and plate, that the block will not move until the plate has moved forward and carried the pin to the forward end of the slot, this position of the parts being clearly shown at the right in Fig. 10, in which view, however, the stud is omitted for the sake of clearness in illustration. The forward end of the plate is made of just sufficient height to pass over the inner head of the stud and engage the shank just above the inner head. The object of this construction is to avoid the possibility of the stud becoming tilted or in any way displaced in the forward movement before it is engaged by the cross-slides. This is perfectly accomplished by causing the sliding plate to move forward slightly in advance of the block, the plate engaging the shank and the block the heads of the stud. When the backward movement takes place, the block is stopped by the upright portion of plate 65, as shown at the left in Fig. 10. Springs 71 lie outside of the block, and when the latter moves forward yield and permit the block, carrying the stud with it, to pass forward, as clearly shown at the right in Fig. 10.

74 denotes an opening in plate 65, through which the anvil passes, as will be more fully explained.

Figures 8, 9, 10, 11:
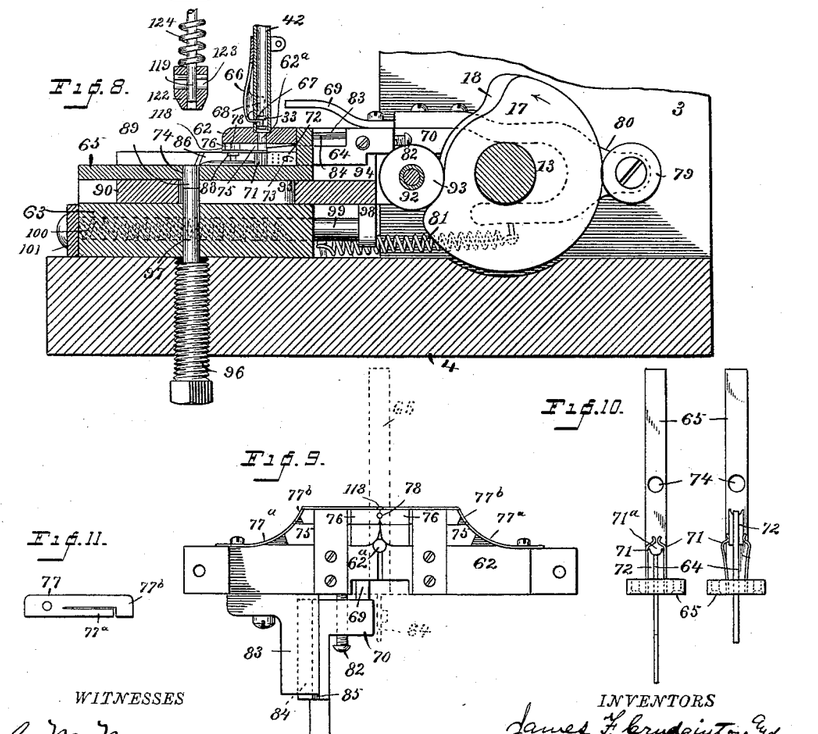
Fig. 9, an inverted plan view of the plate which covers the cross-slides that receive the stud after it leaves the feed-tube.
Fig. 10, a detail view showing in plan two positions of the mechanism which receives the studs from the feed-tube and carries them to the cross-slides shown in Fig. 9.
Fig. 11, a detail view of one of the springs which hold the cross-slides at the closed position.
Figure 12:
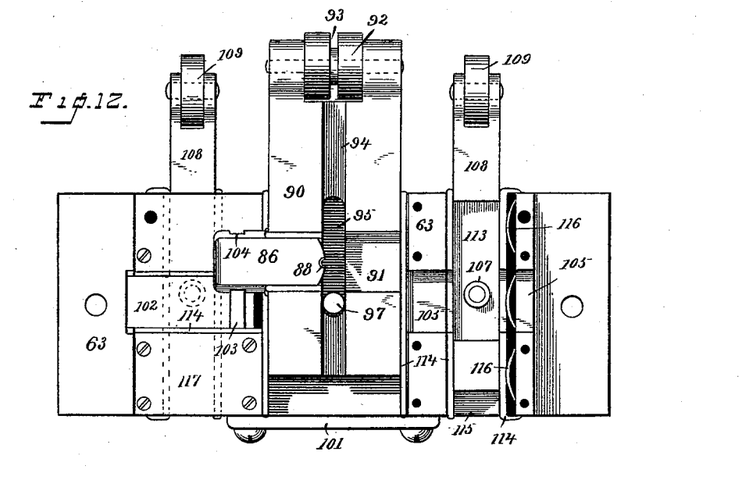
Fig. 12, a detail plan view of the plate which carries the feeding mechanism, the view corresponding substantially with Fig. 5, the operating mechanism, the plate, and slides shown in Fig. 9, and certain of the covering-plates being removed.

Turning now to Fig. 9, which is an inverted plan view of plate 62 and the parts carried thereby, 75 and 76 denote, respectively, the first and second pairs of cross-slides, between which the shank of the stud is passed as it is moved forward by sliding plate 64 into position to be engaged and carried forward by a pair of jaws, which we shall presently describe. It will be noticed that the cross-slides are beveled off on their inner faces, so as to permit them to yield readily as the stud is moved forward. The slides are held at their closed position by means of springs 77. One of these springs detached is shown in Fig. 11.

Separate pairs of springs may be used, if preferred, for each pair of slides. We preferably, however, use a single spring at each end, each spring having a wing $77^a$, which bears upon the outer end of one of the slides $75^b$ and a wing 77, which bears against the end of one of the slides 76. This construction will be readily understood from Fig. 11, in connection with Fig. 9. The plane in which these cross-slides reciprocate is clearly shown in Fig. 8. As sliding plate 64 and block 72 move forward, the block which engages the heads of the stud passes under cross-slides 75 and 76, but the forward end of sliding plate 64, which is in engagement with the shank of the stud, passes between the slides, forcing the shank of the stud forward until it has passed cross-slides 75 and is lodged in socket 78, formed by grooves in the ends of slides 76. By providing two pairs of slides in this manner, the first pair of which drops back to its normal position while the stud is held by the second pair, we insure that no matter how fast the machine may be operated each stud, as it is moved forward by sliding plate 64, will be engaged by the first pair of slides and retained with absolute certainty in its proper position. Slide 70, by which plate 64 is carried, is reciprocated by means of cam 18 on shaft 13. This cam is engaged by a roller 79, carried by a U-shaped piece 80, which incloses the shaft, and the forward end of which is attached to the slide. A spring 81, connected to the U-shaped piece and to the base, acts to draw the parts forward and keep the roller closely in contact with the periphery of the cam. A stop-screw 82 is provided, however, in slide 70, the forward end of which engages plate 62 to limit the forward movement of the slide. This stop-screw prevents the possibility of sliding plate 64 and block 72 moving forward far enough to push the stud beyond socket 78. The slide 70 is carried by a single bracket 83, which is provided with a groove 84 to receive the head of the slide, the slide itself having a groove 85, which receives a rib on the bracket, thereby holding the slide firmly in position. When the stud is in the position last referred to—that is, at the extreme of the forward movement of sliding plate 64—the shank at this moment lying in recess 78 between the inner ends of cross-slides 76, the stud is engaged by jaws 86. (See Figs. 5, 7, and 12.) The under side of the forward end of each jaw is cut away, as at 87. (See Fig. 14.) The upper sides are provided with recesses 88 to receive the inner heads of the stud, the shank between the heads lying in curved grooves just half the diameter of the shank, so that when the jaws close together the stud is firmly gripped between the heads. As soon as the stud has been gripped by the jaws the jaws move forward, carrying the stud with them, until the outer—that is, the lower—head of the stud rests upon the anvil 89. The jaws are carried by a slide 90 and move toward and from each other in closing and opening in a cross-groove 91 in said slide. The slide is reciprocated by means of cam 17 on shaft 13, which engages a roller 92 on the slide. The roller is provided with a central groove 93 to receive the rear end of sliding plate 64 when the latter moves backward. The slide 90 is provided with a groove 94, which receives the forward end of stationary plate 65, and with a slot 95, in which the anvil lies. (See Figs. 7, 8, and 12.) The anvil rests upon the reduced upper end of a screw-stud 96, which passes through a hole 97 in plate 63, the threaded portion of the stud engaging the base. (See Figs. 7 and 8.) Upon the under side of slide 90 are lugs 98, from which studs 99 extend forward into recesses in plate 63. The ends of these studs rest against springs 100. (Shown only in dotted lines in Figs. 7 and 8.) These springs are inserted from the front and are held in place by a plate 101, bolted to plate 63. The springs act to force the slide forward and hold the roller continuously in engagement with the cam. The transverse movement of the jaws is produced by cross-slides 102, each of which is provided at its forward end with a rib 103, which engages a groove 104 in the corresponding jaw. Slides 102 reciprocate in grooves 105 in plate 63. These slides are provided on their under sides with oblique grooves 106, which are engaged by rollers 107 on slides 108, whereby movement is imparted to the cross-slides. At the inner ends of slides 108 are rollers 109, which engage cams 15 and 16 on the main shaft, the construction and arrangement of these parts being clearly shown in Figs. 5, 6, and 12. Upon the under side of each slide is a lug 110, having a stud 111. A spring 112, lying in a recess in plate 63, engages the lug and acts to force the slide outward, holding the roller continuously in engagement with the cam. Slides 108 are provided with cut-away portions 113, which receive cross-slides 102, so that the reciprocation of slides 108 will not interfere in any way with the movements of the cross-slides except through the engagement of rollers 107 with the oblique grooves.

114 denotes gibs, of hardened steel, which we preferably place on both sides of the different slides.

In order to prevent the possibility of injury to the jaws from an imperfectly-formed stud, or by means of a stud getting in other than the proper position, we have so organized this portion of this machine as to permit the jaws to yield outward, if necessary. This result we accomplish by making the grooves 115 in plate 63, in which the slides 108 reciprocate, considerably wider than the slides themselves, and place between the gib and the side of the slide a series of springs 116, which act to hold the gibs firmly in contact with the slides, but will yield, permitting the jaws, cross-slides, and slides 108 to move outward should it be necessary. The ends of these special gibs are made L-shaped, so as to close the ends of the recesses between the gibs and the sides of the grooves, the several slides being held in operative position by covering-plates 117. (See Fig. 12.) It will be readily seen from the above, in connection with Figs. 5 and 12, that at each time slide 90 moves forward or backward it carries the jaws with it, the jaws themselves sliding freely on ribs 103 and being moved inward and outward by means of slides 108 and the cross-slides. As soon as the stud has been grasped by the jaws in the manner described, this movement taking place, of course, at the inner extreme of the movement of slide 90, the jaws move forward in the closed position, carrying the stud forward until the lower head thereof rests upon the anvil. As the shank of the stud is moved out from recess 78, wings 77$^b$ of spring 77 of course yield sufficiently to permit the shank to pass out, the shank passing through a recess 118 in the overhanging front end of plate 62. As soon as the stud has been carried forward to the anvil the operator places a steel over the stud, permitting the shank of the stud to pass through an opening in the steel. While in this position the shank of the stud is set in the steel by heading down the projecting upper end of the shank upon the upper side of the steel. This is accomplished by a setting-punch 119, which is carried by the cross-head in the usual manner. The punch is raised and lowered in adjusting in the usual manner by means of a nut 120 engaging a threaded shank. Not shown. After adjustment the punch is locked in position by set-nuts 121. The construction of the setting-punch is clearly shown in Fig. 8. Outside of the punch proper is a head 122, which is held in position on the punch by a pin passing through a slot 123 in the head. A spring 124 acts to hold the head downward, as in Fig. 8. When the downward movement of the punch and head takes place, the head engages the steel, the shank of the stud entering the opening in the head, and sets the steel down firmly upon the inner head of the stud. An instant later the punch upsets the shank of the stud and rivets it firmly in place.

Figures 1, 1A:
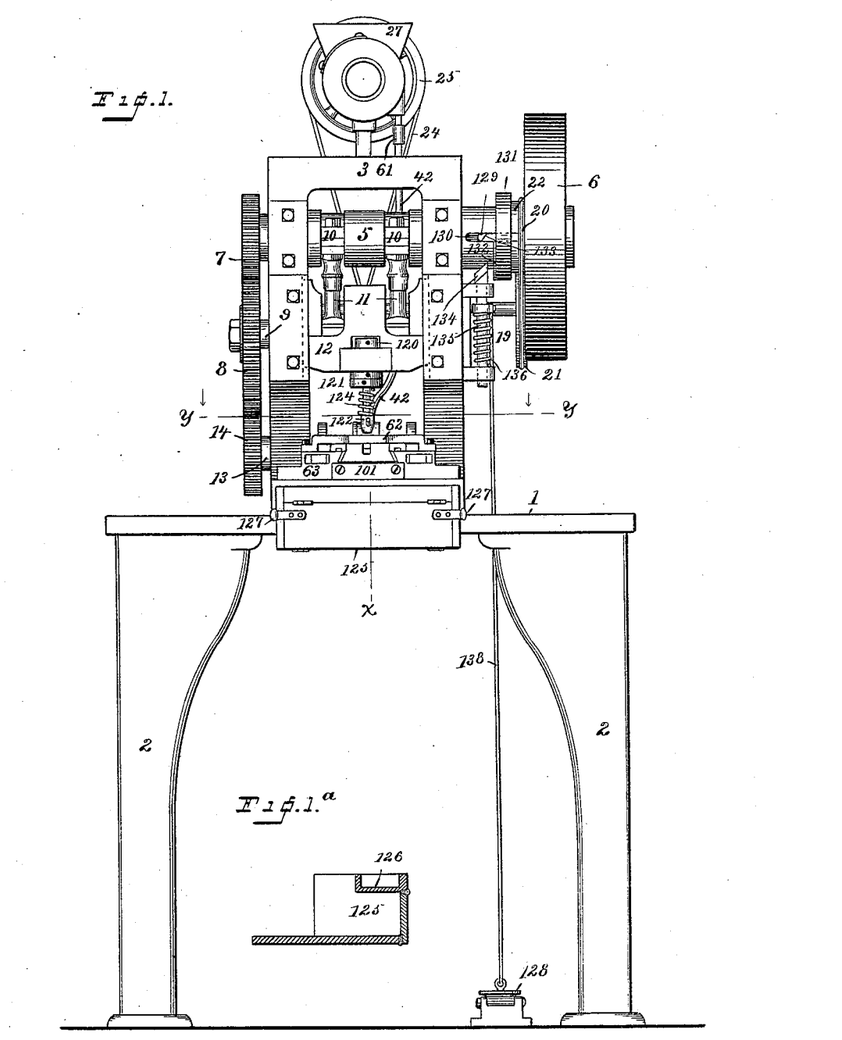
Figure 2:
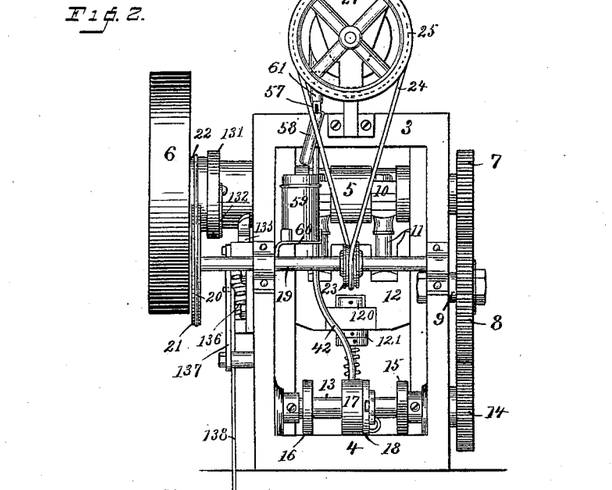
Fig. 2, a rear elevation of the operative parts of the machine, the table being omitted.
Figure 3:
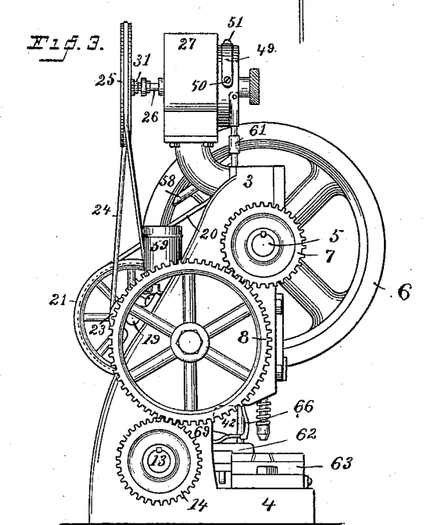
Fig. 3, a left side elevation as seen in Fig. 1.
Figure 4:
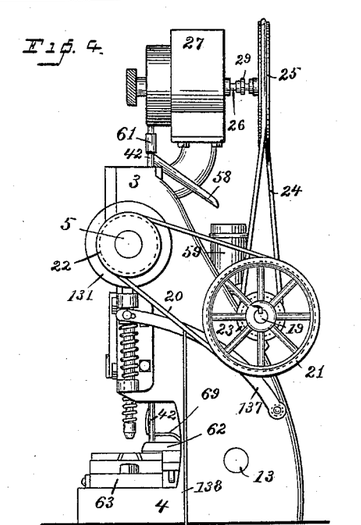
Fig. 4, a right side elevation as seen in Fig. 1, the heavy belt-pulley being omitted.
Figure 5:
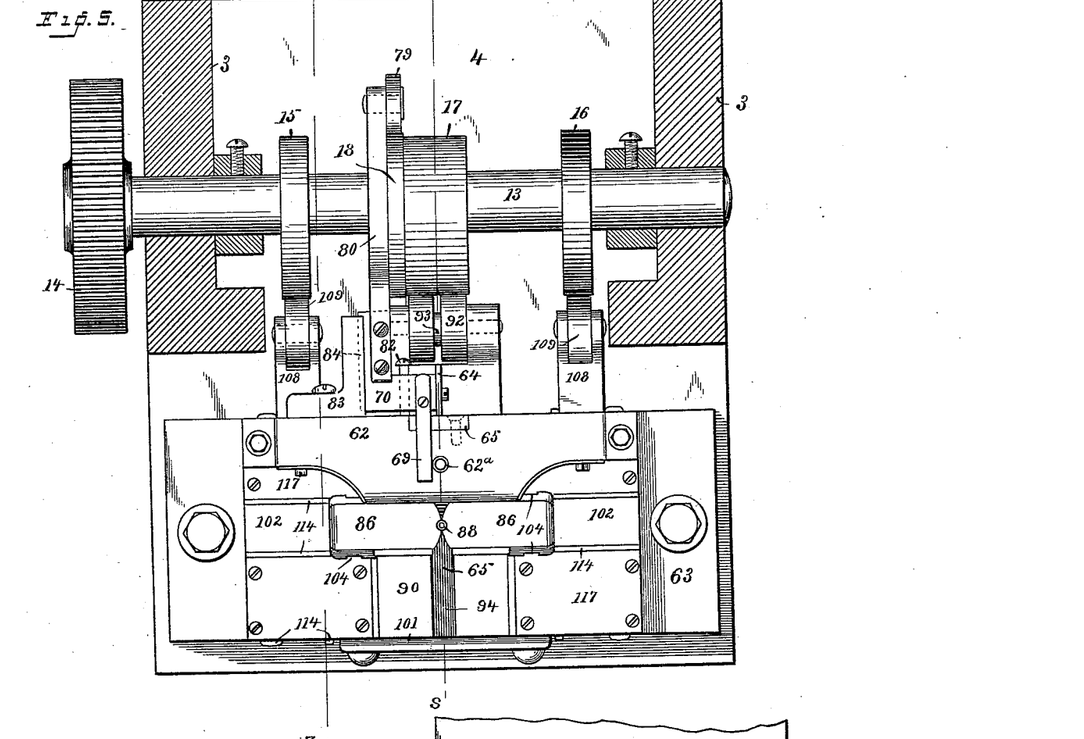
Fig. 5, a cross-section, on an enlarged scale, on the line $y\ y$ in Fig. 1, looking down.
Figure 6:
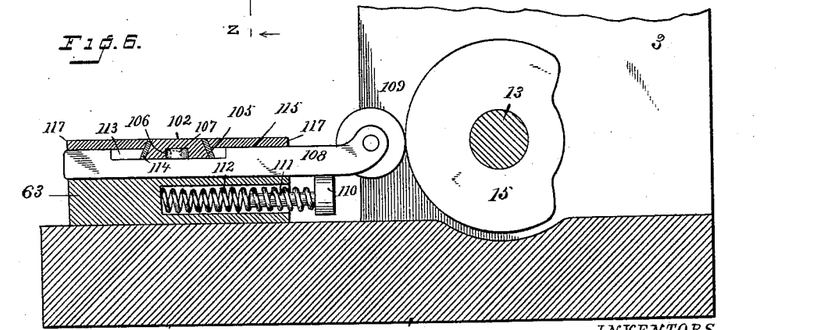
Fig. 6, a section on the line $z\ z$ in Fig. 5.

At the front end of the table we place a box 125 to receive the steels after the studs are set in place. The front of the box is hinged at the bottom, as shown in Fig. 1$^a$. We preferably, also, hinge to the front of the box a box 126 to receive the steels before the studs are set. The steels are usually furnished to the operator in dozen or gross packages. The operator places a package in box 126, and as fast as the studs are set in each steel they are dropped into box 125. This avoids all recounting of the steels after the studs are set. The boxes are attached to the table in any suitable manner and are hinged at the front, as shown, for convenience in use, the front being held in the closed position by means of springs 127, which engage plates on the end piece, as clearly shown in Fig. 1.

In order that the machine may be perfectly under the control of the operator, we provide a clutch controlled by a foot-lever 128. As already stated, belt-pulley 6 is loose on the main shaft. A pin 129, lying in a recess 130 in an enlargement at the outer end of the shaft, passes through a collar 131 and engages the fly-wheel. Spring 132 upon the collar acts to hold the pin in its forward position—that is, in position to connect the belt-pulley with the shaft. At the rear end of the pin is a beveled projection 133, which is adapted to be engaged by a bevel 134 on a releasing-slide 135. A spring 136 acts to throw the slide upward, causing the bevel thereon to engage bevel 133 and force the pin to its retracted position—that is, so that the shaft will be disengaged from the belt-pulley.

137 denotes a lever, the lower end of which is pivoted to the frame-work, the upper end being connected to the releasing-slide. A rod 138 extends from this lever down to foot-lever 128. In the act of setting studs the operator presses down the foot-lever, as shown in the drawings, and draws down the releasing-slide. This releases the pin and permits spring 132 to force the pin into engagement with the belt-pulley. The machine is stopped instantly by the operator removing his foot from the foot-lever.

Having thus described our invention, we claim—

1. In a machine of the class described, the combination, with a feed-wheel having arms provided with sockets adapted to receive the shank of a stud, of a chamber in which said feed-wheel rotates, the upper portion of said chamber consisting of a curved tubular socket with a slot leading into it, said socket and slot being of suitable size to permit the arms of the feed-wheel to turn freely, and a feed-tube connecting with the socket, into which the studs pass from the feed-wheel in the same relative position that they enter the socket.

2. A feed-wheel having arms consisting of shanks with enlargements at their outer ends and in the forward sides of said enlargements sockets of suitable size to receive the shank of a stud, in combination with a chamber the upper portion of which consists of a curved tubular socket with a slot leading into it, said socket and slot being of suitable size, respectively, to receive the enlargements and shanks of the arm, and a feed-tube connecting with the curved tubular socket into which the studs pass from the feed-wheel.

3. A feed-wheel having arms provided with sockets adapted to receive the shank of a stud, in combination with a chamber in which said feed-wheel rotates and in the lower portion of which the studs lie loosely, the upper portion of said chamber consisting of a curved tubular socket having a slot leading into it, said socket and slot being of just sufficient size to permit the arms to pass freely, and a feed-tube connecting with the tubular socket into which the studs pass from the arms.

4. A feed-wheel for studs, rivets, &c., having arms 43, provided in their forward sides with sockets of suitable size to receive the shank of a stud.

5. A feed-wheel for studs, rivets, &c., having arms provided in their forward sides with sockets of suitable size to receive the shank of a stud, the back of said arms and the body of the wheel below the arms being beveled, so that the studs cannot be carried into the tubular socket unless their shanks are in engagement with the sockets in the arms.

6. A feed-wheel having arms provided with sockets adapted to receive the shanks of studs, in combination with a chamber in which said feed-wheel rotates, a hopper having an opening communicating with the chamber, and slides by which the size of the opening may be regulated, substantially as described.

7. The combination, with the feed-wheel having arms provided in their forward sides with sockets and adapted to receive the shanks of studs, of a hopper, a chamber connecting therewith, said chamber being formed by a flange projecting outward from the face of the hopper, and a cap engaging the face of the flange.

8. The combination, with a feed-wheel having arms provided in their forward sides with sockets adapted to receive the shanks of studs, of a hopper, a chamber connecting therewith, said chamber being formed by a flange projecting outward from the face of the hopper, a cap engaging the face of the flange, said cap and flange having corresponding grooves and ribs, so as to form a curved tubular socket with a slot opening into it, said slot and socket being of just sufficient size to receive the arms of the feed-wheel, and a feed-tube connecting with the lower end of the socket.

9. The combination, with a feed-wheel having arms provided in their forward sides with sockets adapted to receive the shanks of studs, of a hopper, a chamber connecting therewith, said chamber being formed by a flange projecting outward from the face of the hopper, and a cap engaging the face of the flange, the upper portion of said flange and cap forming a curved tubular socket with a slot leading into it, which receives the arms of the feed-wheel, the inner side of said flange at the bottom being beveled off and a portion of the flange being removed to form an opening into the hopper, so that the contents may be seen at any time.

10. The feed-wheel having arms provided with sockets adapted to receive the shanks of studs, in combination with a chamber in which said feed-wheel rotates, the upper portion of which consists of a curved tubular socket with a slot leading into it, said socket and slot being of suitable size to receive the arms of a feed-wheel, and a feed-tube connecting with the socket into which the studs pass, said feed-tube having an overflow-slot 57, which permits the studs to drop out when the lower portion of the tube is filled.

11. The combination, with the hopper, chamber, feed-wheel having a groove 32, and a shaft therefor, having a disk 31, of a belt-pulley loose on the shaft and a sliding collar on said shaft, having a pin 30, which passes through the disk and is adapted to engage the groove, the feed-wheel being carried by the shaft when the pin is in engagement with the groove, leaving the shaft free to rotate without carrying the feed-wheel when said parts are disengaged.

12. The combination, with the feed-tube and sliding plate 64, which receives the heads of the studs as they drop from the feed-tube, of a plate 65, which receives the heads of the studs when plate 64 moves backward, and block 72, carried by plate 64, and springs 71 upon plate 65, which form a recess for the stud.

13. The feed-tube and sliding plate 64, in combination with plate 65, block 72, carried by plate 64, and springs 71, secured to plate 65, said block and springs being curved to form a recess into which the stud drops when plate 64 moves backward, substantially as described.

14. The combination, with the feed-tube and plate 65, of sliding plate 64, having at its forward end a block 72 of sufficient height to engage both heads of a stud, said plate being higher than the block and recessed therein, and the parts connected by slot and pin, so that when the forward movement of the plate takes place the forward end of the plate will pass over the inner head of the stud and engage the shank above said inner head, thereby preventing displacement of the stud as it is moved forward.

15. The combination, with the feed-tube and plate 65, of sliding plate 64, having at its forward end an inwardly-curved block 72, and springs 71, secured to plate 65 and curved over the forward end of block 62 when the latter is retracted, thereby forming a recess to receive a stud, said springs yielding when the plate and block move forward and permitting the stud to be carried out of the recess.

16. In a machine of the class described, the combination, with sliding plate 64, of spring-actuated slides 75 and 76, between which the shank of a stud is passed by said slides, the second pair of slides having grooves at their forward ends forming a socket to receive the shank.

17. The combination, with sliding plate 64, engaging the shank of a stud, and block 72, carried by said plate and engaging the heads of the stud, of spring-actuated cross-slides 75 and 76 above the plane of said block, the second pair of cross-slides having grooves forming a socket into which the shank of the stud is forced by the sliding plate.

18. The combination, with sliding plate 64, of cross-slides 75 and 76 and springs having wings engaging said slides independently, so as to permit the first pair of slides to be moved back to their normal position while the stud is held by the second pair.

19. The combination, with cross-slides 76, by which the shank of the stud is gripped, of jaws which engage the stud and longitudinal slide 90, by which the jaws are carried.

20. The combination, with cross-slides 76, by which the shank of the stud is gripped, of jaws cut away on their under sides and having recesses to receive the inner heads of the studs and grooves to receive the shanks thereof, and a longitudinal slide 90, by which the jaws are carried.

21. Slide 90, having a cross-groove, and jaws 86, moving in said groove, in combination with cross-slides 102, having ribs engaging the jaws, and slides 108, by which movement is imparted to said cross-slides.

22. Slide 90, having a cross-groove, and jaws 86, moving in said groove, in combination with cross-slides 102, having ribs engaging the jaws and oblique grooves 106 in their under sides, and slides 108, having cut-away portions to receive the cross-slides, and rollers 107, engaging the oblique grooves, substantially as described.

23. The combination, with jaws 86 and cross-slides 102, having ribs engaging the jaws and oblique grooves in their under sides, of slides 108, having rollers engaging the oblique grooves, plate 63, having grooves 115, in which said slides reciprocate, said grooves being wider than the slides, gibs on the outer sides of the slides, and between the gibs and the sides of the slides series of springs 116, which hold the gibs firmly in contact with the slides, but permit the jaws, the cross-slides, and slides 108 to yield outward, as and for the purpose set forth.

24. The combination, with sliding plate 64, adapted to engage the shank of a stud, block 72, carried by said plate, which engages the heads of the stud, and spring-actuated cross-slides 75 and 76, which receive the stud from said sliding plate, of sliding jaws 86, which receive the stud from the cross-slides, and slide 90, by which said jaws are carried.

25. The combination, with a feed-tube, plate 65, and sliding plate 64, having at its forward end a block 72, of cross-slides 75 and 76, sliding jaws 86, and slide 90, by which said jaws are carried.

26. The combination, with sliding jaws 86 and slide 90, by which they are carried, of the anvil and setting-punch.

27. The combination, with the setting-punch and anvil, of a pair of sliding jaws carried by a slide 90, by which the stud is carried to the anvil, and sliding plate 64, and cross-slides 75 and 76, by which the stud is placed in position to be grasped by the jaws.

28. The combination, with the sliding jaws, of cross-slides 75 and 76, sliding plate 64, having at its forward end a curved block 72, and plate 65, having springs 71, substantially as described.

29. The combination, with the sliding jaws, cross-slides 75 and 76, and sliding plate 64, of the feed-tube and the feed-wheel.

30. The combination, with a feed-wheel having arms with sockets in their forward sides to receive the shank of a stud, a chamber having a curved tubular socket and a slot leading thereto, said socket and slot receiving the arms of the feed-wheel, and a feed-tube which receives the stud from the tubular socket, of sliding plate 64, the cross-slides, and jaws.

In testimony whereof we affix our signatures in presence of two witnesses.

JAMES F. CRUDGINTON.
EUGENE E. NORTON.

Witnesses:
A. M. WOOSTER,
ARLEY I. MUNSON.